United States Patent [19]

Rhoads et al.

[11] Patent Number: 4,883,374
[45] Date of Patent: Nov. 28, 1989

[54] THRUST BEARING ASSEMBLY

[75] Inventors: Thomas G. Rhoads, Thomaston; Paul M. Cornish, Burlington, both of Conn.

[73] Assignee: The Torrington Company, Torrington, Conn.

[21] Appl. No.: 190,617

[22] Filed: May 3, 1988

[51] Int. Cl.$^4$ ............................................. F16C 19/30
[52] U.S. Cl. .................... 384/618; 384/620; 384/626
[58] Field of Search ............. 384/452, 455, 590, 593, 384/618–623, 626, 903

[56] References Cited

U.S. PATENT DOCUMENTS

| | | | |
|---|---|---|---|
| 3,934,956 | 1/1976 | Pitner | 384/620 X |
| 3,951,482 | 4/1976 | Blaydon et al. | 384/485 |
| 3,999,816 | 12/1976 | Pitner | 384/620 |
| 4,310,205 | 1/1982 | Condon, Jr. et al. | 384/620 |
| 4,725,153 | 2/1988 | Tsuruki | 384/626 X |

FOREIGN PATENT DOCUMENTS 1341765  9/1963  France .............................. 384/618

*Primary Examiner*—Thomas R. Hannon
*Attorney, Agent, or Firm*—Wayne O. Traynham

[57] ABSTRACT

An improved thrust bearing assembly combines a thrust bearing with a thrust washer spacer which is attached to the trust bearing to provide a one-piece thrust bearing assembly. The spacer is made of plastic and has a variable predetermined axial thickness so as to facilitate the assembly of some automotive transmissions.

1 Claim, 1 Drawing Sheet

THRUST BEARING ASSEMBLY

This invention relates to thrust bearings. More particularly, this invention is a thrust bearing assembly which utilizes a plastic annular spacer having a predetermined axial thickness. The spacer can also assist in holding the bearing assembly together. This invention is particularly suitable for use with thrust bearings required during the assembly of some automobile transmissions. When these transmissions are being assembled, a thrust bearing typically lies flat in a partially-assembled transmission, while one end of a transmission fluid pump is lowered onto the thrust bearing. A metal washer is positioned on the lower end of the pump so as to mate with the upper surface of the facing thrust washer of the thrust bearing. This metal washer is typically held in place on the lower end of the pump by the use of metal tangs which protrude upward and into apertures in the lower end of the pump, which are specifically designed to receive the tangs. In addition, grease is spread on the upper surface of the metal washer so that when the washer is pressed against the lower end of the pump, the grease also helps hold the washer to the pump.

The improved thrust bearing assembly of the present invention solves several problems associated with the use of the prior art metal washers. The use of grease is no longer required, which eliminates the attraction of some grit and dirt which inhibit the optimal performance of the thrust bearing. In addition, the plastic spacer of the present invention is less expensive to manufacture than the metal washer with its tangs. Assembly of the transmission is made faster and less expensive using plastic spacers of predetermined thicknesses. An axial measurement is made before assembling the thrust bearing assembly and the pump to the transmission. A thrust bearing assembly with a spacer of the correct thickness is chosen and used in the assembly process, rather than having to use a separate metal washer as in the past.

This invention is an improvement to U.S. Pat. No. 4,310,205 for a "Thrust Washer Retainer Band", issued on Jan. 12, 1982, to Charles E. Condon, Jr., Dean E. Johnston, and Charles W. Shattuck, and assigned to The Torrington Company. That patent discloses a thrust bearing having a configuration of the preferred embodiment of the present invention without the selective thrust washer spacer described in more detail below.

Briefly described, the present invention comprises a thrust bearing with an attached thrust washer spacer. The spacer has a variable predetermined axial thickness. The preferred embodiment of the invention comprises a thrust bearing having at least one protrusion extending radially outward from an annular band which is affixed to the outer periphery of the thrust bearing. Possible modifications include a spacer which has at least one radially inwardly extending retainer to hold the thrust bearing assembly together in one piece. Another possible modification comprises an annular band which has a radially outwardly extending flange instead of one or more protrusions.

The invention, as well as its many advantages, may be further understood by reference to the following detailed description and drawings in which.

Figure 1:
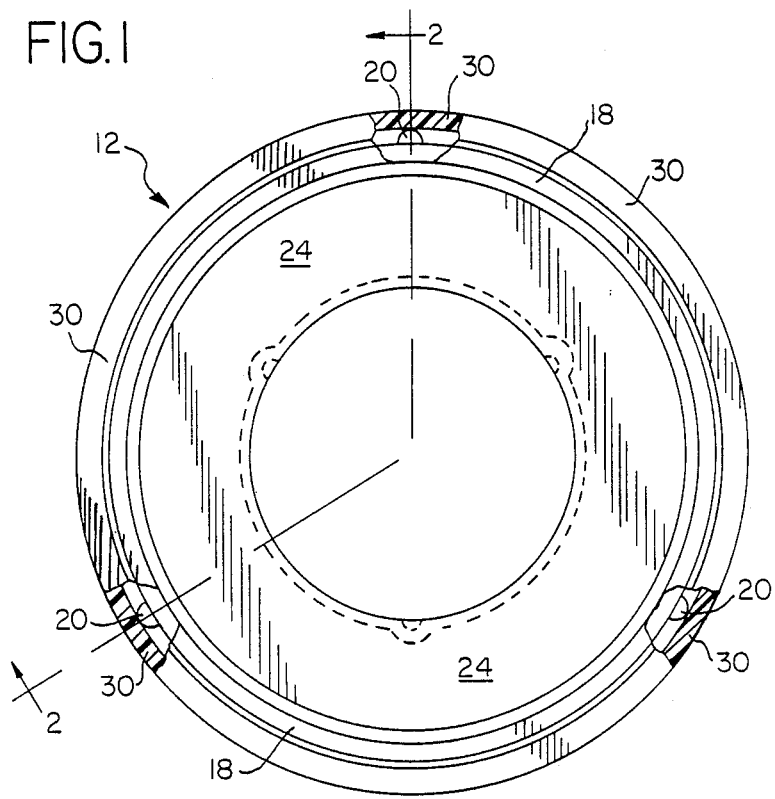
FIG. 1 is a front view of a thrust bearing assembly of the present invention shown in its preferred embodiment with partial cutaway views of the protrusions.
Figure 2:
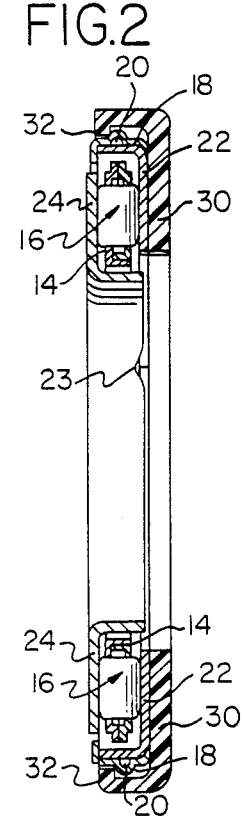
FIG. 2 is a side sectional view of the thrust bearing assembly shown in FIG. 1, taken along line 2—2 in FIG. 1.

Referring to the drawings and more particularly to FIGS. 1 and 2, the thrust bearing assembly 12 comprises a cage 14 which retains multiple rollers 16, an annular band 18 which has one or more protrusions 20 and is affixed to a first thrust washer 22, a second thrust washer 24, and a selective thrust washer spacer 30 having a predetermined thickness. Washer 22 is connected to cage 14 by band 18. Washer 24 is fastened to cage 14 by means such as staking, as depicted at 23 in FIG. 2. The band 18 is similar to the band disclosed in U.S. Pat. No. 4,310,205 to Condon, Jr., et al, which also discloses protrusions similar to protrusions 20 of the present invention. The three protrusions 20 are circumferentially spaced approximately 120° apart, and they provide means for affixing spacer 30 to band 18. The resulting unitary bearing assembly 12 facilitates the automobile transmission assembly process described above. Selective spacer 30 has a variable axial thickness dimension and may be as much as twice the thickness, or more, shown in FIG. 2. The needs of the assembler determine how many different predetermined thicknesses are available during assembly. As measurements are made during the transmission assembly process, a thrust bearing assembly with a spacer of the correct thickness is chosen and utilized to assemble a particular transmission. This prevents excessive axial end-play in the assembled transmission, which could inhibit or prevent proper operation of the clutch assemblies in the transmission. The number of available spacers of predetermined thicknesses is determined so as to be compatible with the assembly process being used.

As can be seen in FIG. 2, spacer 30 has a radially inwardly extending lip 32 which cooperates with protrusions 20 to ensure that thrust bearing assembly 12 is held together in one unitary piece. Spacer 30 is preferably made of a resilient material, such as plastic, so protrusions 20 can be snapped past lip 32. There is enough retention between protrusions 20 and lip 32 to prevent the thrust bearing assembly 12 from separating when inadvertently dropped to the ground level.

Figure 3:
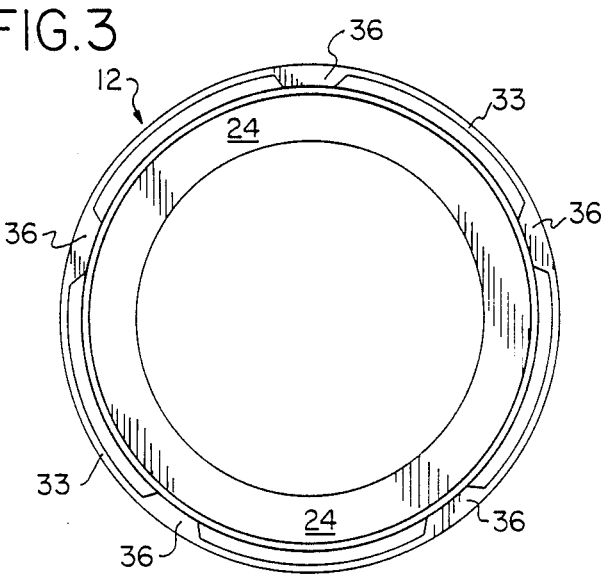
FIG. 3 is a front view of an alternate embodiment of the present invention, showing a selective spacer with five retainers.

Turning now to FIG. 3, an alternate embodiment of the thrust bearing assembly of the present invention is depicted. Like numbers refer to like parts in FIGS. 3 and 4. Protrusions 20 are not required with this configuration, because the modified selective spacer 33 has multiple retainers 36 which retain the thrust bearing by retaining the outer radial edge of cage 14. This makes both band 18 and protrusions 20 optional.

Retainers 36 could also retain a thrust bearing which has no cage by retaining the outer radial edge of the thrust washer adjacent the retainers 36. If the thrust bearing is configured so that the thrust washer will retain the remainder of the thrust bearing, then the cage 14 also becomes optional, in addition to the band and protrusions.

Figure 4:
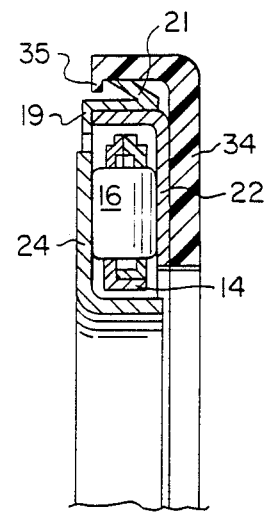
FIG. 4 is a partial side sectional view in elevation of a second alternate embodiment of the present invention showing a selective spacer similar to that shown in FIGS. 1 and 2, as well as a modified thrust bearing band.

FIG. 4 depicts a second alternate embodiment of the thrust bearing assembly. The selective spacer 34 is similar to spacer 30 in FIGS. 1 and 2. Band 19 is modified to replace protrusions 20 with a continuous 360° annular flange 21 which cooperates with lip 3 (similar to lip 32 in FIG. 2) to prevent spacer 34 from separating from the thrust bearing. This configuration also eliminates the need for protrusions 20.

We claim:

1. A thrust bearing assembly comprising:

a thrust bearing having at least one thrust washer having a radially-extending portion and an axial annular flange and a plurality of rollers adapted to roll along said radially-extending portion of said thrust washer;

an annular band having an axially-extending annular portion having a periphery engaging a periphery of said thrust washer flange of said thrust bearing; and a selective thrust washer spacer having an annular configuration adapted to allow said spacer to be affixed to said band, said spacer having a radially inwardly extending annular lip, and said annular band having a radially outwardly extending annular flange, said flange being configured to cooperate with said lip of said spacer so as to hold said thrust bearing, said band, and said spacer together in a unitary thrust bearing assembly, said flange being configured to facilitate easy installation of said band into said spacer while providing a positive locking action which prevents the band from being pulled away from said spacer without damaging said band or said spacer.

* * * * *